United States Patent Office 3,522,958
Patented Aug. 4, 1970

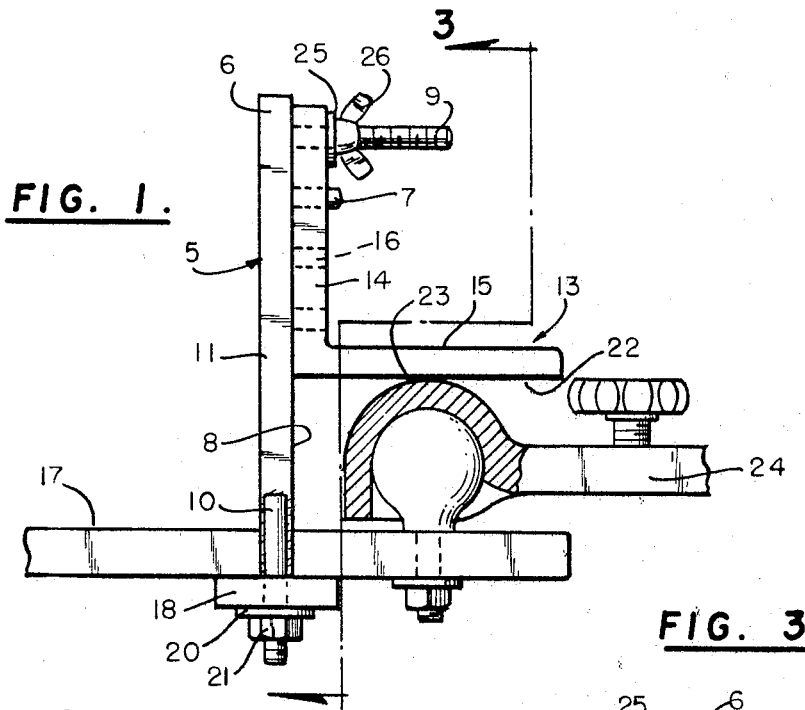
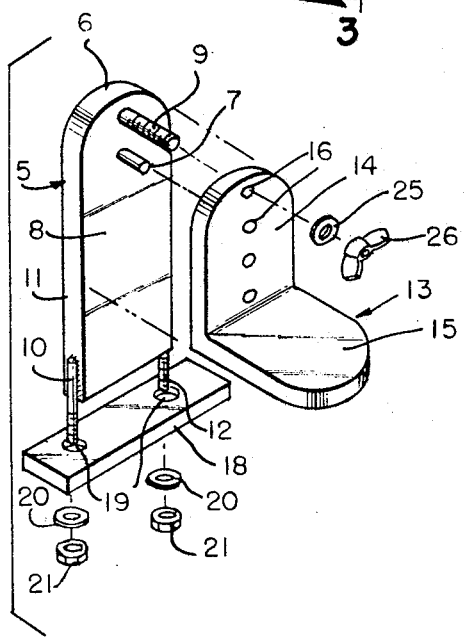
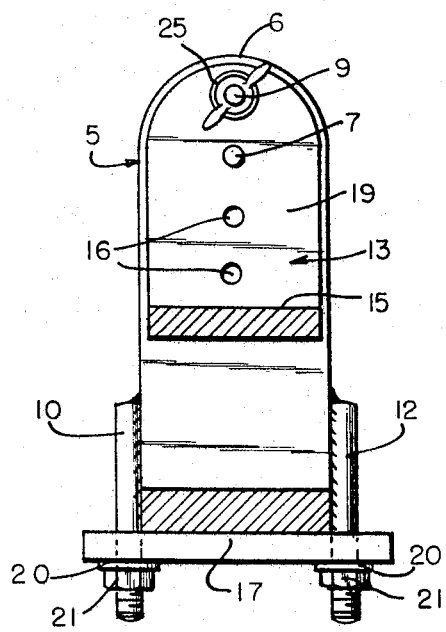
INVENTOR
Delmar J. Lusignan

3,522,958
GUARD FOR TRAILER HITCH
Delmar J. Lusignan, 955 Sunnyside Drive,
Bridge City, Tex. 77611
Filed Dec. 8, 1967, Ser. No. 689,114
Int. Cl. B60d 1/12
U.S. Cl. 280—511                                3 Claims

ABSTRACT OF THE DISCLOSURE

This invention consists of a vertically disposed rectangular member that is secured to the vehicle portion of a ball type trailer hitch by means of a rectangular locking bar that is firmly held in place by means of two spaced and fixed screws having lock-washers and nuts thereon. An L-shaped member, having a plurality of spaced openings in the vertically disposed leg thereof, is placed with its vertically disposed leg up against the rearward face of the aforesaid rectangular member which is provided with a horizontally disposed pin and a horizontally disposed stud that will project through two of the openings in the vertically disposed leg of the L-shaped member. A wing nut that is placed on the stud will firmly lock the two just described parts of this invention together after the two parts of the trailer hitch have been connected together. The horizontally disposed leg of the aforesaid L-shaped member rests on top of the trailer portion of the hitch, thus preventing the two parts of the trailer hitch from becoming accidentally separated.

---

It is the principal object of this invention to provide a guard for trailer hitch that will prevent the two parts of the trailer hitch from accidentally becoming disengaged.

Another object of this invention is to provide a guard for trailer hitch that does not embody any chains or other parts that are subject to wear and which would break by reason of their movement when the trailer is being towed from one place to another.

Still another object of this invention is to provide a guard for trailer hitch that can be adapted to any size of a ball-type hitch.

These together with other objects and advantages which will become subsequently apparent reside in the details of construction and operation as more fully hereinafter described, and claimed, reference being had to the accompanying drawing forming a part hereof, wherein like numbers refer to like parts throughout, in which:

FIG. 1 is a side view of this invention, assembled and in use.

FIG. 2 is a perspective exploded view of this invention.

FIG. 3 is a vertically disposed sectional view of this invention, taken along line 3—3 of FIG. 1, and viewed in the direction indicated by the arrows.

This invention consists of a vertically disposed rectangular member 5 having a rounded upper end 6 and a horizontally disposed pin 7 projecting backward from the lateral center of the upper portion of the face 8. A horizontally disposed threaded stud 9 projects outward from the same face 8 above and parallel to the aforesaid pin 7, as one can see by looking at FIGS. 1 and 2 of the accompanying drawing.

A vertically disposed stud 10, having threads on the lower portion thereof, is welded to one side 11 of the aforesaid member 5, while a like stud 12 is likewise welded to the other side of the same member 5, as is best shown in FIG. 3 of the drawing. Here it is also seen that this invention also embodies an L-shaped member 13, having a vertically disposed leg 14, whose outer end is rounded as is the outer end of the horizontally disposed leg 15 whose outer end is also rounded. A plurality of equally spaced and vertically disposed openings 16 are located in the lateral center of the aforesaid leg 14 of the L-shaped member 13. This configuration of member 13 permits the two members 5 and 13 to be assembled, as is best shown in FIG. 1 of the drawing. Here it is seen that the aforesaid rectangular member 5 is placed on top of the horizontally disposed trailer hitch member 17 that is suitably secured to the rear end of a vehicle. A rectangular locking bar 18, having a vertically disposed opening 19 in each end thereof, is placed underneath the aforesaid trailer hitch member 17 and in line with the aforesaid vertically disposed rectangular member 5 whose two threaded studs 10 and 12 will now fit through the already mentioned openings 19 in the rectangular locking bar 18. A lock washer 20 and nut 21 are placed and secured on the lower and outer end of each stud 10 and 11, thus firmly locking the vertically disposed member 5 in its desired position on the trailer hitch member 17.

When this invention is assembled in the manner shown in FIG. 1 of the accompanying drawing it will be seen that the underside 22 of the horizontally disposed leg 15 of the L-shaped member 13 will rest on top of the raised portion 23 of the female portion of trailer hitch member 24. The aforesaid pin 7 projecting through one of the openings 16 in the vertically disposed leg 14 of the just mentioned L-shaped member 13 will prevent the member from turning while the lock washer 25 and the wing nut 26 on stud 9 will firmly hold the L-shaped member 13 in its desired position.

From the foregoing, it is seen that I have herein provided a guard for trailer hitch that fully meets all of the objects of this invention. This guard for trailer hitch is subject to any detailed changes and/or modifications one may care to make in the same in so long as the detailed changes and/or modifications fall within the scope and intent of the appended claims.

What I now claim as new is:

1. A guard for a trailer hitch of the type having a horizontally disposed hitch member secured to the rear of the towing vehicle, a ball secured to said hitch member, a second horizontally disposed hitch member secured to the front of the trailer and a ball receiving socket secured to the outer end of said second mentioned hitch member; the hitch comprising a vertically extending member having a flat vertically extending face and a rounded upper end, means for securing the lower end of the vertically extending member to the first mentioned hitch member with said face adjacent to the ball, an L-shaped member having a vertical leg adjacent to said face, a pin projecting horizontally outward from the lateral center and upper portion of said face from which also projects horizontally and rearward a threaded stud in parallel spaced relation to, and above the said pin, and a plurality of uniformly spaced openings in said vertical leg, the openings being spaced the same as said pin and said stud, and a nut threaded on said stud, the L-shaped member also having a horizontally extending leg extending over the top of the socket when the coupling is connected.

2. The invention of claim 1, wherein the said vertically disposed member is secured to the upper surface of the first mentioned trailer hitch members by means of a vertically disposed threaded stud that is secured to each side of the said vertically disposed member projecting downward with their outer ends through openings in a rectangular locking bar to which the studs are secured by means of lock washers and nuts.

3. The invention of claim 2, wherein the said L-shaped member is firmly secured to the said vertically disposed member after the two parts of the trailer hitch have been secured to one another by means of a wing nut that is screwed onto the threaded horizontally disposed stud.

References Cited

UNITED STATES PATENTS

| 2,571,349 | 10/1951 | Eckles | 280—507 X |
| 3,047,839 | 7/1962 | Brown et al. | 280—507 X |
| 3,393,924 | 7/1968 | Silver | 280—507 X |
| 2,697,618 | 12/1954 | Hulsted | 280—515 |
| 2,705,157 | 3/1955 | Dail | 280—515 |

LEO FRIAGLIA, Primary Examiner

R. R. SONG, Assistant Examiner

U.S. Cl. X.R.

280—507